No. 646,072. Patented Mar. 27, 1900.
M. H. HART.
HOSE PIPE.
(Application filed May 25, 1899.)
(No Model.)
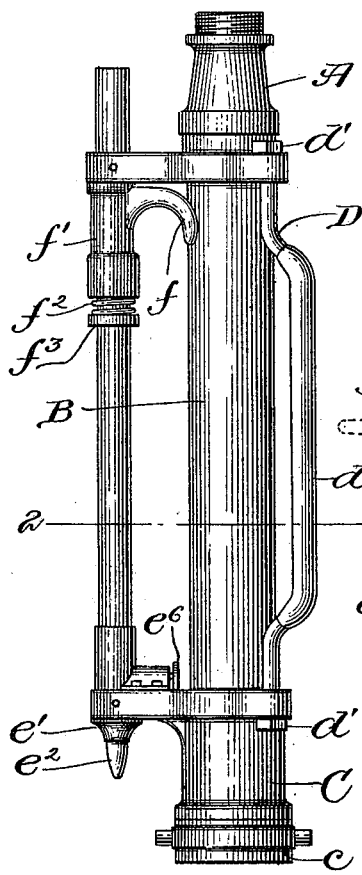
Fig. 1.
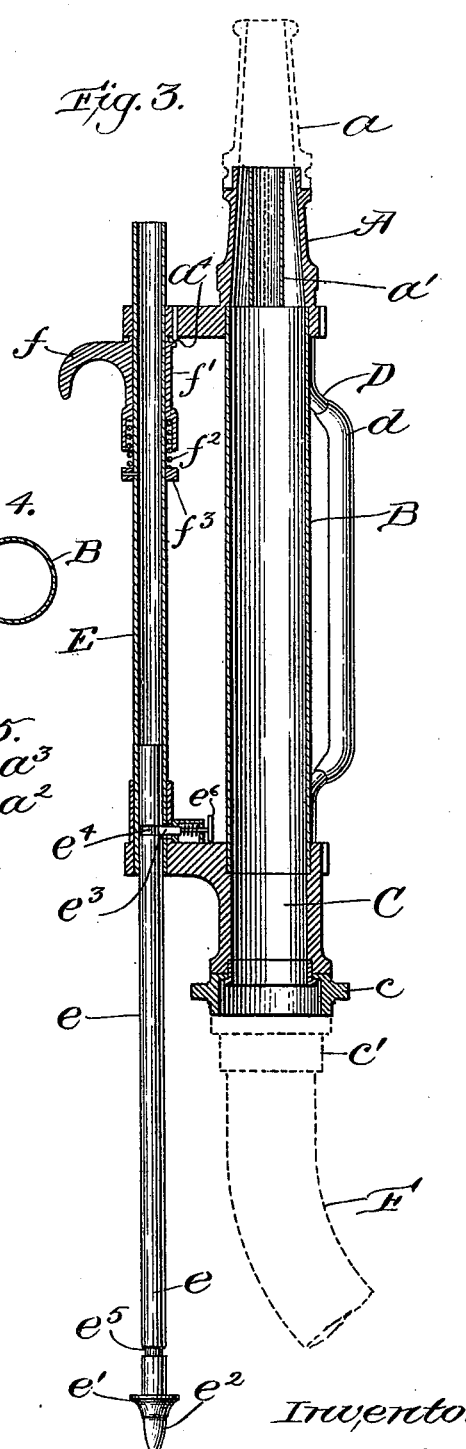
Fig. 3.
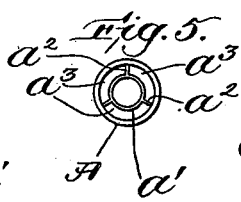
Fig. 4.
Fig. 5.
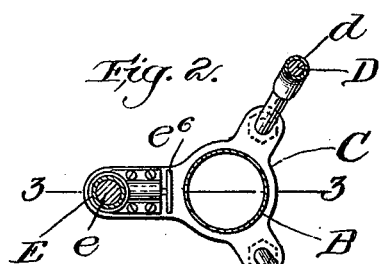
Fig. 2.
Witnesses:
Arthur F. Randall
Fayette N. Wheeler
Inventor:
Milton H. Hart
by Chas. K. Drew
Attorney.
THE NORRIS PETERS CO., PHOTO-LITHO., WASHINGTON, D. C.

UNITED STATES PATENT OFFICE.

MILTON H. HART, OF BOSTON, MASSACHUSETTS.

HOSE-PIPE.

SPECIFICATION forming part of Letters Patent No. 646,072, dated March 27, 1900.

Application filed May 25, 1899. Serial No. 718,258. (No model.)

*To all whom it may concern:*

Be it known that I, MILTON H. HART, of Boston, in the county of Suffolk and State of Massachusetts, have invented certain new and useful Improvements in Hose-Pipes, of which the following is a specification.

My invention has for its object to improve the construction of hose pipes or nozzles; and it consists of a hose pipe or nozzle embodying in its construction certain new and useful features, combinations, and arrangements of parts, all as is hereinafter particularly set forth in the following description and the novel features of which are particularly pointed out and clearly defined in the claims at the close thereof.

Of the drawings, Figure 1 is a side elevation of a hose pipe or nozzle embodying this invention. Fig. 2 is a section on line 2 2 of Fig. 1. Fig. 3 is a longitudinal section of the hose pipe or nozzle shown in Figs. 1 and 2, taken on line 3 3 of Fig. 2. Figs. 4 and 5 are details hereinafter referred to.

The body portion of the hose pipe or nozzle shown in the drawings comprises three sections A, B, and C, secured together by means of bars D D and tube E.

The bars D D serve as handles to be grasped by the hoseman in manipulating the pipe or nozzle and are each covered throughout the greater portion of their length by an insulating-sleeve $d$. The ends of each handle-bar D project through lugs or projections on the sections A and C and have their ends threaded to receive nuts $d'$.

Section C has connected therewith by a swivel-joint one member $c$ of a coupling, which is adapted to engage the other member $c'$ of the coupling, which is mounted on the end of the hose F, which is shown by dotted lines in Fig. 3.

Section A is made tapering and is adapted to have an extension $a$ (shown by dotted lines) of any suitable construction attached thereto. Within section A a longitudinal and central inner tube $a'$ is arranged, which is secured in position therein by the radial partitions $a^2$, (see Fig. 5,) thereby providing a series of longitudinal waterways or passages $a^3$, that serve to guide the water as it passes through them in straight lines and prevent rotative movement thereof and insure a solid stream of water for a considerable distance after leaving the nozzle.

Within the tube E is located a rod $e$, which is provided at its outer end with an enlargement or head $e'$, which tapers toward the end, as at $e^2$, and said rod is movable in tube E and can be drawn out into extended position, as shown in Fig. 3, when in use or retracted or caused to occupy the position shown in Fig. 1 when not in use.

As a means for securing the rod $e$ in either of its positions a spring-pressed locking-slide $e^3$ is herein provided, which is mounted upon the section C with its inner end in engagement with the bar $e$. When the bar $e$ is drawn out to its extended position, the locking-slide $e^3$ is projected into an annular groove $e^4$, formed in the rod $e$ near the inner end thereof, and when in this position the bar $e$ may be rested upon the ground or the floor of a building and serve as a support for the pipe or nozzle, and thus relieve the hoseman of the weight of the pipe or nozzle and hose, as well as from the back pressure exerted by the water in discharging therefrom. When the bar $e$ is moved into its retracted position, the slide $e^3$ engages an annular groove $e^5$, formed in bar $e$ near its lower or outer end, and locks said bar in that position. The locking-slide $e^3$ is provided with a thumb-piece $e^6$, by means of which the said slide may be drawn out of engagement with bar $e$ to release the latter when it is desired to adjust the bar.

I have found it convenient and desirable to provide also a support-engaging means of a character and in principle different from rod $e$ and comprising a hook projecting from the pipe or nozzle adapted to engage the rung of a ladder or any other convenient support, and said hook is preferably so constructed and arranged that it may be caused to occupy either an extended or projected operative position or a retracted inoperative position when not in use, in which latter position it is to be folded back out of the way. For this purpose I have provided a hook $f$, provided with a hub $f'$, which is loosely mounted upon the tube E and normally pressed longitudinally against and in engagement with a pin $a^4$, projecting from said section, by means of a spring $f^2$, which surrounds tube E and which bears at one end against said hub and at its opposite end against a fixed collar $f^3$, mounted on tube E. By moving hub $f'$ longitudinally on tube E away from and out of engagement with pin $a^4$ said hub may be rotated so as to swing the hook $f$ from one position to the opposite—that is to say, from its inoperative position (shown in Figs. 1 and 4) to its operative position (shown in Fig. 3 and by dotted lines in Fig. 4)—and when released the hub $f'$ will be moved by spring $f^2$ back into engagement with pin $a^4$.

The hub $f'$ is formed with a notch $f^4$, into which the pin $a^4$ projects to lock the hook in its retracted or inoperative position, and with a notch $f^5$, into which the pin $a^4$ projects to lock the hook in its extended or operative position.

What I claim, and desire to secure by Letters Patent, is—

1. In a hose pipe or nozzle, the combination of a body portion comprising sections A, B, and C; handle-bars D, D, and tube E, adapted to secure said sections together; a movable bar $e$, mounted in said tube; and means for locking said bar in adjusted position, substantially as described.

2. A hose pipe or nozzle having a movable support-engaging hook projecting therefrom adapted to occupy an extended operative position or a retracted inoperative position, substantially as described.

3. A hose pipe or nozzle having a movable support-engaging hook mounted thereon adapted to occupy an extended operative position, or a retracted inoperative position, and means for locking said hook in either position, substantially as described.

4. In a hose pipe or nozzle, the combination of sections A, B, and C, handle-bars D, D, tube E, bar $e$, means for locking said bar in adjusted position, hook $f$, and means for locking said hook in adjusted position, substantially as described.

MILTON H. HART.

Witnesses:
ETHEL M. WINWARD,
CHAS. H. DREW.